No. 804,877. PATENTED NOV. 21, 1905.
J. F. O'NEIL & W. J. HANCOCK.
GOVERNOR VALVE MECHANISM FOR ROTARY ENGINES.
APPLICATION FILED NOV. 21, 1903.

4 SHEETS—SHEET 2.

Witnesses
Otto E. Hoddick
Dena Nelson

J. F. O'Neil
W. J. Hancock
Inventors.

By
Attorney

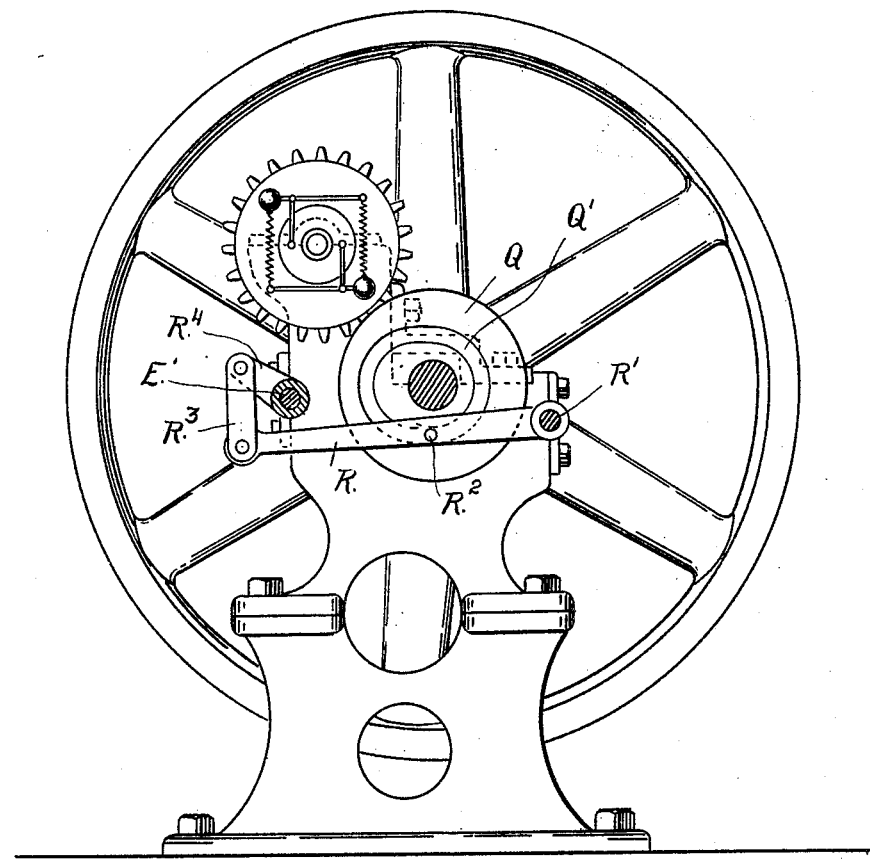
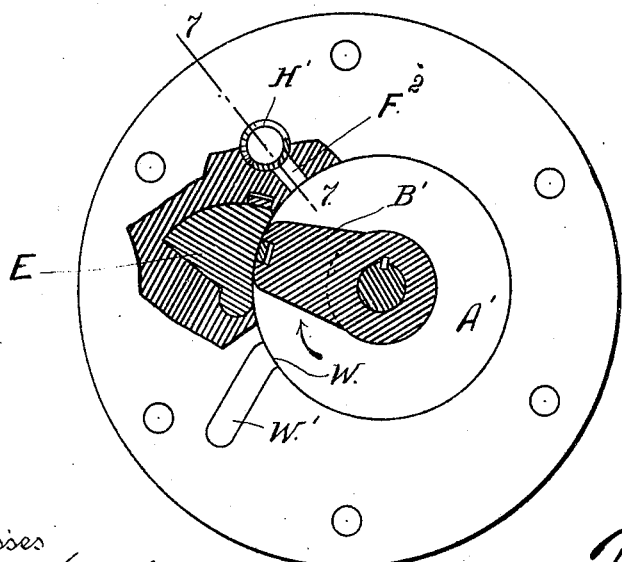

No. 804,877. PATENTED NOV. 21, 1905.
J. F. O'NEIL & W. J. HANCOCK.
GOVERNOR VALVE MECHANISM FOR ROTARY ENGINES.
APPLICATION FILED NOV. 21, 1903.

4 SHEETS—SHEET 4.

Witnesses
Otto E. Hoddick
Dena Nelson.

J. F. O'Neil.
W. J. Hancock.
Inventors

By
Attorney

UNITED STATES PATENT OFFICE.

JOHN FRANCIS O'NEIL AND WILLIAM JAMES HANCOCK, OF FREELAND, COLORADO.

GOVERNOR-VALVE MECHANISM FOR ROTARY ENGINES.

No. 804,877.     Specification of Letters Patent.     Patented Nov. 21, 1905.

Application filed November 21, 1903. Serial No. 182,172.

*To all whom it may concern:*

Be it known that we, JOHN FRANCIS O'NEIL and WILLIAM JAMES HANCOCK, citizens of the United States of America, residing at Freeland, in the county of Clear Creek and State of Colorado, have invented certain new and useful Improvements in Governor-Valve Mechanism for Rotary Engines; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in governor-valve mechanism for rotary engines; and it consists of the features, arrangements, and combinations hereinafter described and claimed, all of which will be fully understood by reference to the accompanying drawings, in which is illustrated an embodiment thereof.

Figure 1:
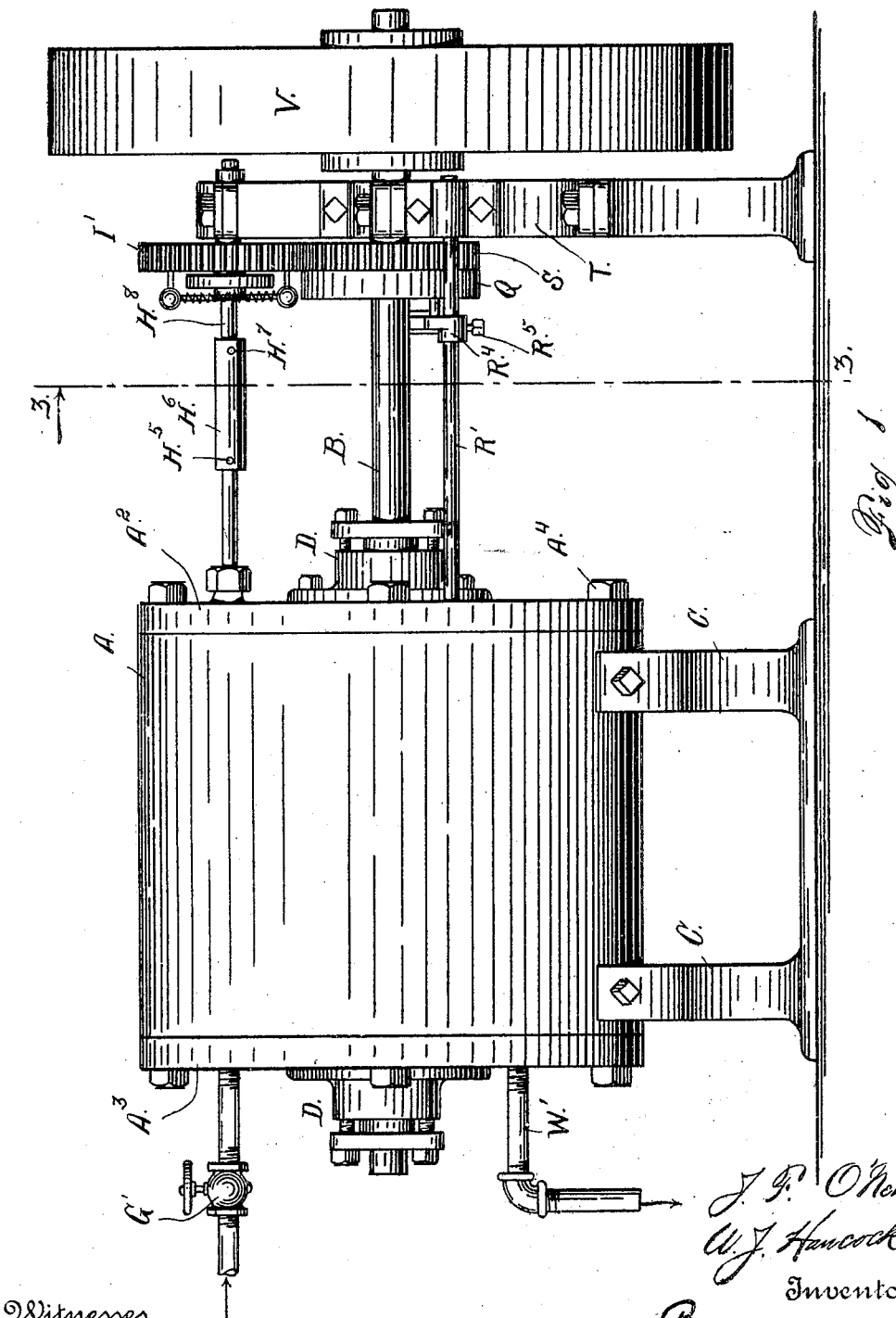
Figure 2:
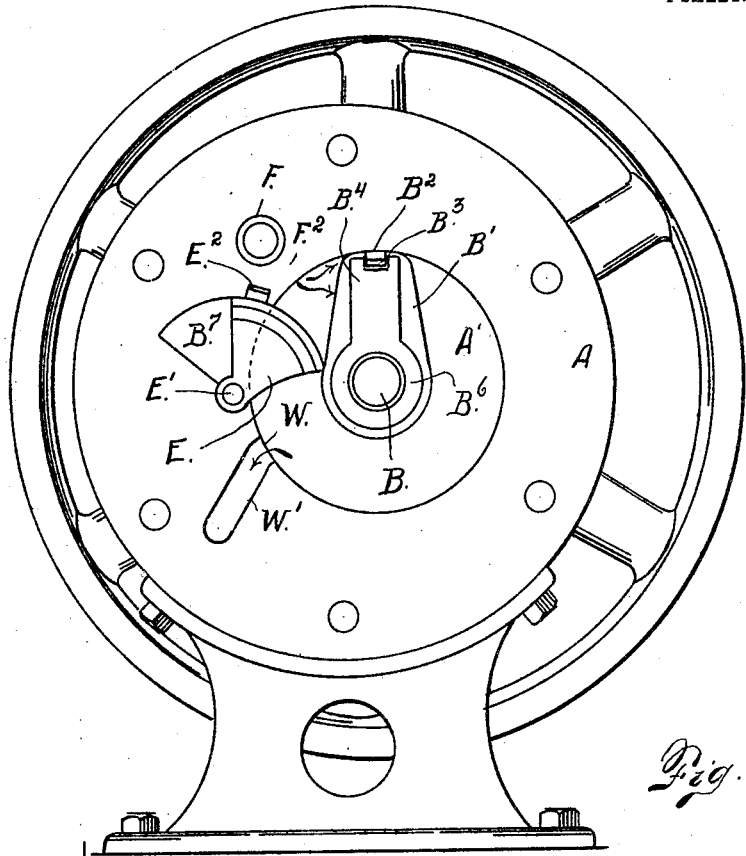
Figure 5:
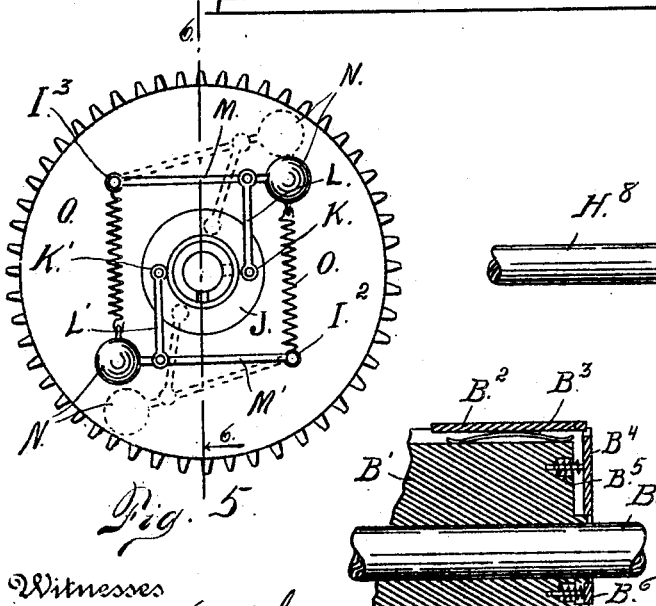
Figure 6:
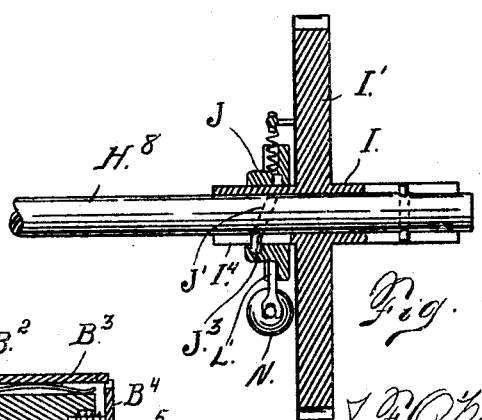
Figure 11:
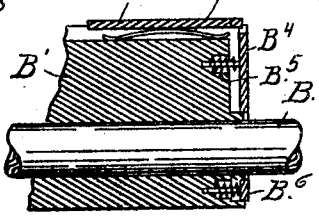
Figure 7:
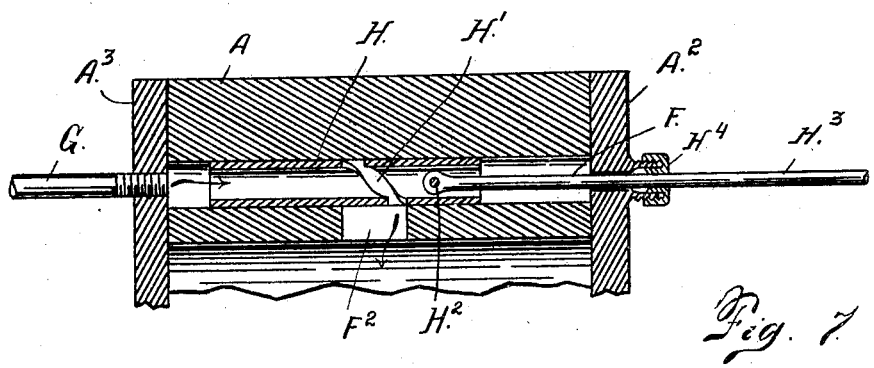
Figure 8:
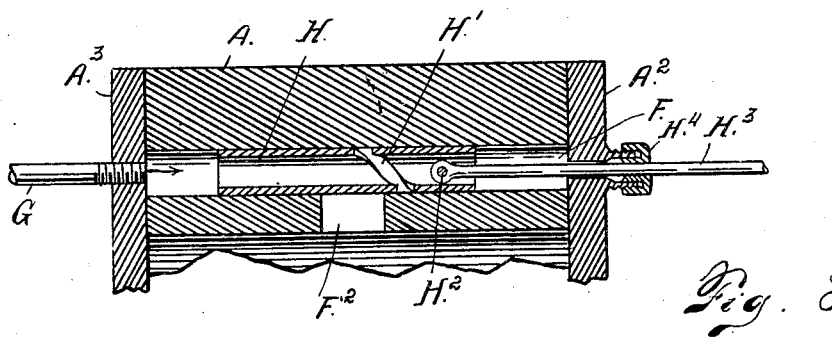
Figure 9:
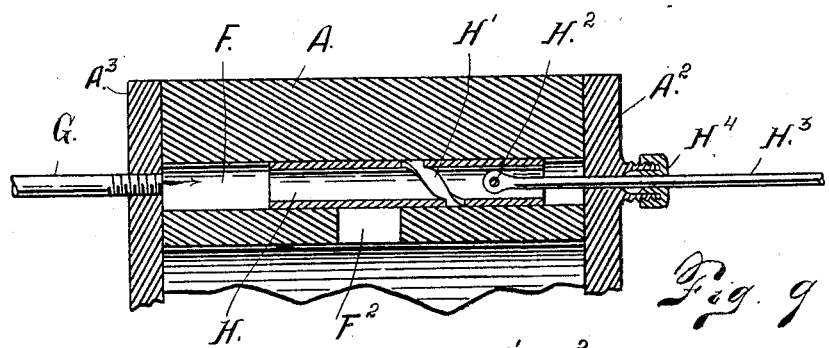
Figure 10:
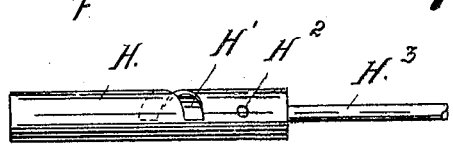

In the drawings, Figure 1 is an elevation of our improved machine. Fig. 2 is an end view of the same with one of the cylinder-heads removed. Fig. 3 is a section taken on the line 3 3, Fig. 1, looking in the direction of the arrow. Fig. 4 is an end view of the cylinder with one head removed and parts shown in section. Fig. 5 is a detail view of the governor, shown on a larger scale than in Fig. 1. Fig. 6 is a section taken on the line 6 6, Fig. 5, viewed in the direction of the arrow. Figs. 7, 8, and 9 are sectional detail views of the cylinder, taken through the induction-port and showing the governor-valve in different positions. Fig. 10 is a detail view of the valve.

The same reference characters indicate the same parts in all the views.

Let A designate a cylinder which is bored slightly to one side of its axial center to form a chamber $A'$, through which passes an operating-shaft B, carrying a piston $B'$, which rotates with the shaft and whose outer extremity is grooved to receive a packing-plate $B^2$, which is actuated by a spring $B^3$. The ends of the piston $B'$ are also grooved to receive packing-plates $B^4$, actuated by springs $B^5$. The ends of the cylinder are provided with heads $A^2$ and $A^3$, which are secured to the body of the cylinder by bolts $A^4$. These heads close the piston-chamber $A'$ tightly at its extremities through the instrumentality of the packing-plates $B^4$, connected with the piston as aforesaid. Attention is called to the fact that the packing-plates $B^4$ are formed integral with the washer part $B^6$, which surrounds the operating-shaft B. As shown in the drawings, the cylinder is mounted on supports C. The heads of the cylinder are provided with suitable stuffing-boxes D, through which the operating-shaft passes.

At one side of the piston-chamber $A'$ and communicating therewith an auxiliary chamber $B^7$ is formed, extending the entire length of the body of the cylinder. Located in this auxiliary chamber is a valve E, made fast to a rock-shaft $E'$, journaled in the cylinder, whereby it is adapted to move freely for the purpose of throwing the valve inwardly into the chamber $A'$ and back into the chamber $B^7$, according to the position of the piston $B'$. The cylinder is grooved adjacent the curved face of the valve E to receive a spring-actuated packing-plate $E^2$, whereby a fluid-tight joint is formed between the valve and the cylinder. The cylinder is bored on a line parallel with its axis to form an induction-passage F, communicating with the chamber $A'$ by means of a port $F^2$. Steam is introduced into the passage F through a pipe G, provided with a throttle-valve $G'$. Within the passage F is located a tubular valve H, which will be termed the "governor-valve." This valve fits nicely within the passage F and is adapted to slide longitudinally as well as rotate in the said passage. The valve is provided with a spiral or inclined slot $H'$. This slot is inclined to the axis of the cylinder, and its length measured on a line parallel with the axis of the tube is just equal to the width of the port F. Hence it is evident that by moving the valve longitudinally the entrance of steam from the tubular valve H to the port F may be controlled or entirely cut off. The tubular valve H is connected, as shown at $H^2$, with a stem $H^3$, which passes through the head $A^2$ of the cylinder and a stuffing-box $H^4$, mounted thereon to make a steam-tight joint. The outer extremity of the stem $H^3$ is connected, as shown at $H^5$, with a part $H^6$, the last-named part being also connected by a pin $H^7$ with a spindle $H^8$, passing through the hub I of a gear-wheel $I'$. The hub of this gear is splined on the spindle $H^8$, whereby the wheel and spindle rotate in unison, the spindle being at the same time adapted to move longitudinally in the hub of the wheel.

Mounted to have a limited rotary movement upon the hub I is a collar J, provided with a spiral groove J', into which projects a pin $J^3$, made fast on the spindle $H^8$. Connected with the collar J at points K and K', located on opposite sides of the axis of the spindle, are two links L and L', whose extremities remote from the collar are connected with arms M and M', which are pivoted on the gear I', as shown at $I^2$ and $I^3$. The extremities of the arms M and M' remote from their pivots are provided with weights N. The weighted extremity of each arm is connected with a spring O, whose opposite extremity is connected with the pivots $I^2$ and $I^3$, the arrangement of the parts being such that the two arms M and M' are located on opposite sides of the spindle $H^8$ and normally occupy a position parallel to each other, being held in this their normal position by virtue of the tension of the springs O. When, however, the speed of the machine is too great, the centrifugal force will throw the arms M and M' outwardly to the dotted-line position, for instance, in Fig. 5 of the drawings, thus turning the collar J on the wheel-hub I and shifting the spindle $H^8$ longitudinally, whereby the governor-valve H is moved sufficiently within the induction-passage F to cut off partially or entirely the entrance of steam to the chamber A' by way of the port $F^2$. It will be observed that when the governor-valve is shifted as shown in Fig. 9 the fluid is entirely cut off from entrance to the piston-chamber by way of the port F, also that when the valve H is in the position shown in Fig. 7 the valve is wide open, while when the same valve is in the position shown in Fig. 8 the entrance of steam to the piston-chamber is only partially cut off. Attention is called to the fact that the hub I of the wheel is slotted, as shown at $I^4$, to permit the pin $J^3$ to move longitudinally with the spindle $H^8$ during the movement of the governor-valve, for the purpose heretofore explained.

The function of the valve E is to separate the live steam from the exhaust during the operation of the machine, and this function is performed continuously except when the piston itself is located between the inlet and exhaust ports; but in this case the inlet or induction port $F^2$ is closed against the entrance of the operating fluid by virtue of the position of the governor-valve, since at this time no part of the spiral slot H' registers with the induction-port $F^2$. As soon, however, as the piston in turning in the direction of the arrow in Fig. 4 passes beyond the inlet-port $F^2$ the operating fluid begins to enter the chamber A' and the valve E moves outwardly (see Fig. 2 of the drawings,) and this movement is automatically and positively accomplished through the instrumentality of mechanism which will now be described.

Mounted on the operating-shaft B' is a collar Q, in which is formed a cam-slot Q'. An arm R, pivoted at R', is provided with a pin $R^2$, which enters the cam-slot Q'. The extremity of the arm R remote from its pivot is connected, by means of a link $R^3$, with a crank $R^4$, made fast to the rock-shaft E'. Hence as the operating-shaft is turned the arm R is oscillated, operating the shaft E' for the purpose of actuating the valve E, as heretofore explained. The operating-shaft is provided with a fast gear S, which meshes with the gear I, for the purpose of rotating the governor-valve and actuating the governor, as heretofore explained. The extremity of the shaft B remote from the cylinder is journaled a suitable support T, while outside of this support a fly-wheel V is made fast to the operating-shaft.

As shown in the drawings, the pivot R', upon which the arm R is mounted to oscillate, consists of a rod having one end mounted on the head $A^2$ of the cylinder and the other end mounted in the support T. As indicated in the drawings, this rod turns in its bearings, the crank $R^4$ being made fast thereto by a set-screw $R^5$.

From the foregoing description the use and operation of our improved machine will be readily understood. The steam, air, or other suitable fluid enters the chamber A' of the cylinder by way of the inlet-pipe G, the governor-valve H, and the port $F^2$, while the operating fluid exhausts from the said chamber by way of a port W, with which is connected an exhaust-pipe W', screwed into the head $A^3$ of the cylinder. Assuming that the piston B' is in the position shown in Fig. 4 of the drawings, the valve E fills the chamber $B^7$, since the piston B' is in such position that this is necessary in order to allow the piston to move. When, however, the piston has moved sufficiently to bring any portion of the port $F^2$ on its left, the valve E is automatically moved into the chamber A' and the space between the piston and the valve E (see Fig. 2) is filled with live steam, which acts on the piston to continue its movement until the piston has passed beyond the port W or beyond a portion of the said port, in which event the driving fluid will exhaust through the passage W' and the momentum of the piston will be sufficient to carry it beyond the valve E sufficiently to allow the operating fluid to enter through the induction-port $F^2$, when the operation is continued as before.

It will be understood that by properly regulating the slot H' of the governor-valve H the fluid may be cut off from the piston-chamber during any desired portion of the revolution of the operating-shaft, whereby the piston may be driven on expansion during any desired portion of the stroke. The manner of shifting the governor-valve longitudinally and automatically for the purpose of regulating the speed of the piston on its operating-shaft has already been described.

Having thus described our invention, what we claim is—

The combination with a shaft and a fluid-actuated device for operating said shaft, of a gear-wheel actuated from the shaft, means for controlling the supply of fluid to the said device comprising a passage communicating with the device, a valve located in said passage and longitudinally movable to control the supply of fluid thereto, a spindle upon which the said gear is splined whereby the spindle is allowed to move longitudinally through the gear which is provided with a hub, a collar revoluble on the hub of the gear and having a spiral groove, the spindle having a pin projecting into said groove, spring-held governor-arms pivoted on the gear on opposite sides of the collar and having their corresponding extremities diagonally located, a link connection between the said arms and the collar whereby as the speed of the gear passes a predetermined limit, the governor-arms are thrown outwardly and partial rotary movement imparted to the collar whereby the spindle is shifted longitudinally in the gear, and a connection between the spindle and the governor-valve whereby the latter is actuated, substantially as described and for the purpose set forth.

In testimony whereof we affix our signatures in presence of two witnesses.

JOHN FRANCIS O'NEIL.
WILLIAM JAMES HANCOCK.

Witnesses:
S. L. FULKERSON,
RUFUS C. BONNEY.